United States Patent
Tanaka et al.

(10) Patent No.: US 11,267,341 B2
(45) Date of Patent: Mar. 8, 2022

(54) FRONT PART STRUCTURE OF VEHICLE CABIN

(71) Applicants: TOYOTA JIDOSHA KABUSHIKI KAISHA, Aichi (JP); SUBARU CORPORATION, Tokyo (JP)

(72) Inventors: Yoko Tanaka, Toyota (JP); Masashi Kawamoto, Okazaki (JP); Naoki Sawada, Toyota (JP); Takeshi Yokoi, Toyota (JP)

(73) Assignees: TOYOTA JIDOSHA KABUSHIKI KAISHA, Aichi (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/160,384

(22) Filed: Jan. 28, 2021

(65) Prior Publication Data
US 2021/0245602 A1 Aug. 12, 2021

(30) Foreign Application Priority Data
Feb. 7, 2020 (JP) .............................. JP2020-019585

(51) Int. Cl.
| | | |
|---|---|---|
| *B60K 37/04* | (2006.01) | |
| *B60H 1/00* | (2006.01) | |
| *B60R 21/205* | (2011.01) | |
| *B62D 25/14* | (2006.01) | |

(52) U.S. Cl.
CPC ........... *B60K 37/04* (2013.01); *B60H 1/0055* (2013.01); *B60R 21/205* (2013.01); *B62D 25/145* (2013.01)

(58) Field of Classification Search
None
See application file for complete search history.

(56) References Cited

U.S. PATENT DOCUMENTS

| | | | |
|---|---|---|---|
| 9,120,454 B2 * | 9/2015 | Gorman | ................ B60R 21/205 |
| 2020/0047813 A1 | 2/2020 | Tanaka | |

FOREIGN PATENT DOCUMENTS

| | | | | |
|---|---|---|---|---|
| DE | 10016419 A1 * | 11/2001 | ......... | B60H 1/00792 |
| JP | H8118942 A | 5/1996 | | |
| JP | 2001113935 A | 4/2001 | | |
| JP | 2007038844 A * | 2/2007 | | |
| JP | 2018122678 A | 8/2018 | | |
| JP | 2019127247 A | 8/2019 | | |
| JP | 202026218 A | 2/2020 | | |

* cited by examiner

*Primary Examiner* — Faye M Fleming
(74) *Attorney, Agent, or Firm* — Hauptman Ham, LLP

(57) ABSTRACT

A front part structure of a vehicle cabin may include: an instrument panel including an air outlet at an end of the instrument panel on a passenger seat side; an air conditioner main body arranged inside the instrument panel at a center in a vehicle width direction; a cross beam arranged inside the instrument panel and connected to a right side and a left side of a vehicle body; and an air duct arranged inside the instrument panel and connecting the air conditioner main body to the air outlet. The air duct may extend in front of the passenger seat at a height lower than the cross beam.

3 Claims, 2 Drawing Sheets

FRONT PART STRUCTURE OF VEHICLE CABIN

CROSS-REFERENCE TO RELATED APPLICATION

This application claims priority to Japanese Patent Application No. 2020-19585 filed on Feb. 7, 2020, the contents of which are hereby incorporated by reference into the present application.

TECHNICAL FIELD

The technique disclosed herein relates to a front part structure of a vehicle cabin in a vehicle. The technique particularly relates to an arrangement of an air duct connecting an air conditioner main body to an air outlet. The air conditioner main body is arranged inside an instrument panel at a center in a vehicle width direction. The air outlet is disposed on the instrument panel on a passenger seat side.

BACKGROUND

In a vehicle, an air conditioner main body configured to regulate the temperature in a vehicle cabin is often arranged inside an instrument panel at the center in a vehicle width direction. An air outlet is provided at an end of the instrument panel (a part thereof near a front pillar). The air outlet at the end of the instrument panel may be called a side register. An air duct connecting the air conditioner main body to the air outlet is arranged inside the instrument panel. It should be noted that in the disclosure herein, "instrument panel" is an interior part located at a front portion of a vehicle cabin and is a housing that houses various meters, audio equipment, switches, air bags, and the like.

In each of vehicles disclosed in Japanese Patent Application Publication Nos. 2019-127247 and 2018-122678, a hollow cross beam that is arranged inside an instrument panel and connected to right and left sides of a vehicle body is used as an air duct. The cross beam arranged inside the instrument panel and connected to the right and left sides of the vehicle body may be called an instrument panel member or an instrument panel reinforcement.

In each of vehicles disclosed in Japanese Patent Application Publication Nos. H08-118942 and 2001-113935, an air duct is arranged proximate to an upper surface of an instrument panel.

SUMMARY

A windshield is located above an instrument panel, and an upper surface of the instrument panel is exposed to direct sunlight. If an air duct is arranged proximate to the upper surface of the instrument panel, cool air passing through the air duct is heated by the heat of the upper surface of the instrument panel. Since a cross beam is located proximate to the upper surface of the instrument panel, air passing through the cross beam may is also heated by the sunlight.

In a front part structure of a vehicle cabin disclosed herein, an air duct connects an air conditioner main body to an air outlet at an end of an instrument panel, and the air duct extends in front of a passenger seat at a position lower than a cross beam. The structure in which the air duct extends in front of the passenger seat at the position lower than the cross beam may diminish an influence of heat of an upper surface of the instrument panel on air passing through the air duct.

The air duct may extend under an air bag for the passenger seat. The air duct may extend under an air bag bracket that is fixed to the cross beam and supports the air bag. In either case, an influence of heat of sunlight on the air passing through the air duct may be diminished further.

Details and further improvements of the technique disclosed herein will be described in Detailed Description below.

DETAILED DESCRIPTION

Figure 1:
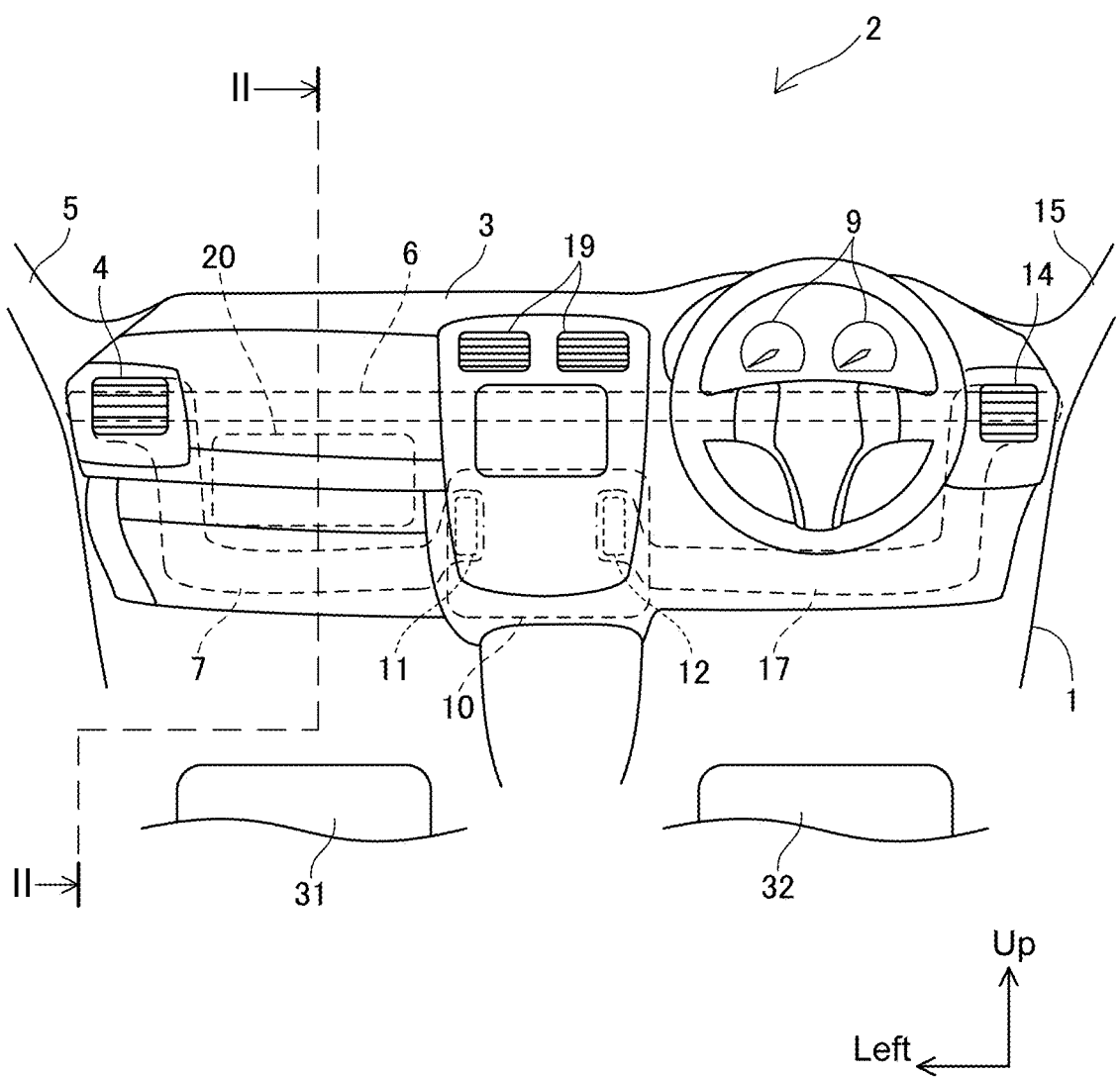
FIG. 1 is a front view of an instrument panel.
Figure 2:
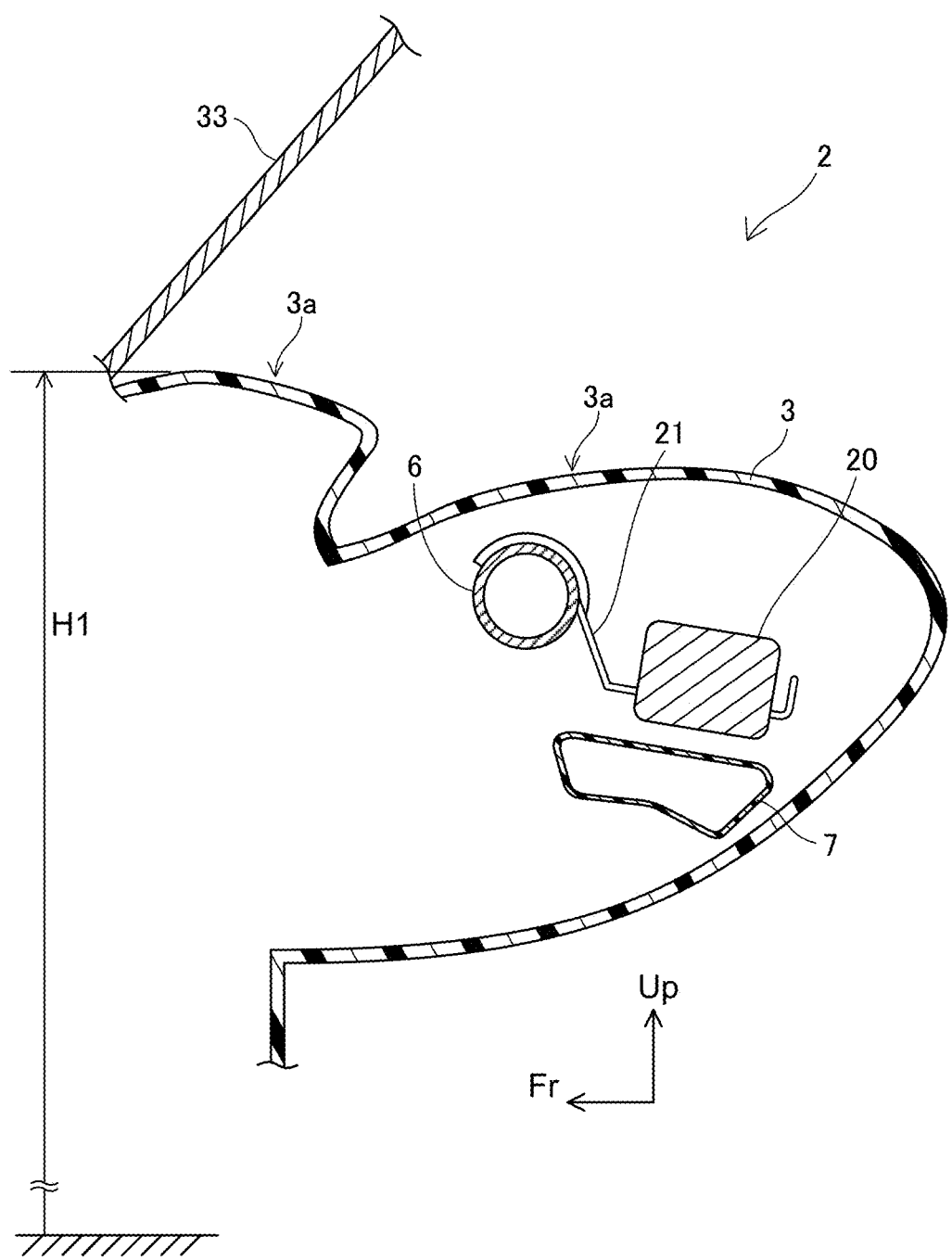
FIG. 2 is a cross-sectional view along a line II-II in FIG. 1.

With reference to the drawings, a front part structure 2 of a vehicle cabin according to an embodiment will be described. FIG. 1 shows a front view of an instrument panel, and FIG. 2 shows a cross-sectional view along a line II-II in FIG. 1. FIG. 2 corresponds to a cross section obtained by cutting an instrument panel 3 in front of a passenger seat 31 along a plane orthogonal to a vehicle width direction.

In a narrow sense, an instrument panel means an instrument 9 on a driver seat 32 side, whereas the instrument panel 3 disclosed herein means a component that extends in front of the driver seat 32 and the passenger seat 31 from one end of a vehicle body 1 to the other end thereof in the vehicle width direction. As noted before, in the disclosure herein, "instrument panel" is an interior component located at a front portion of a vehicle cabin and is a housing that houses various meters, audio equipment, switches, air bags, and the like. The instrument panel may be called a dashboard. The instrument panel 3 is constituted of resin. A windshield 33 (see FIG. 2) is located above the instrument panel 3.

An air conditioner main body 10 is arranged inside the instrument panel 3 at approximately the center of the vehicle body 1 in the vehicle width direction. Air from the air conditioner main body 10 is blown out from air outlets 4, 14, 19 provided at the instrument panel 3. The air outlet 19 that is provided at the center of the instrument panel 3 in the vehicle width direction may be called a center register. The air outlets 4, 14 that are respectively provided at ends of the instrument panel 3 in the vehicle width direction may be called side registers. The air conditioner main body 10 includes air discharge ports 11, 12. The air discharge port 11 is connected to the air outlet 4 on passenger seat 31 side via an air duct 7. The air discharge port 12 is connected to the air outlet 14 on the driver seat 32 side via an air duct 17. Details of the air duct 17 on the driver seat 32 side will be omitted.

In FIG. 1, the air conditioner main body 10, the air ducts 7, 17, a cross beam 6 (to be described later), and an air bag 20 (to be described later) arranged inside the instrument panel 3 are depicted by dashed lines.

The air outlet 19 located at the center in the vehicle width direction is also connected to the air conditioner main body 10 via another air duct, but this air duct is not shown.

The cross beam 6 is arranged inside the instrument panel 3. The cross beam 6 is connected to a right side and a left side of the vehicle body 1. More specifically, the cross beam 6 is connected to a left front pillar 5 and a right front pillar 15. The front pillars 5, 15 are parts of a frame that ensures strength required for the vehicle body 1, and the cross beam 6 is also a part of the frame. The cross beam 6 arranged inside the instrument panel 3 may be called an instrument panel reinforcement.

The air bag 20 for the passenger seat is arranged inside the instrument panel 3 in front of the passenger seat 31. The air bag 20 for the passenger seat is supported by the cross beam 6 via a metal bracket (air bag bracket 21, see FIG. 2). An air bag in front of the driver seat 32 is not shown.

As described above, the air duct 7, which connects the air conditioner main body 10 to the air outlet 4 on the passenger seat 31 side, is arranged inside the instrument panel 3. The air duct 7 extends in front of the passenger seat 31 at a position lower than the cross beam 6. Further, the air duct 7 extends at a position lower than the air bag 20 and the air bag bracket 21.

Advantages obtained by the air duct 7 extending in front of the passenger seat 31 at the low position will be described. An upper surface 3a of the instrument panel 3 is heated by sunlight passing through the windshield 33. If the air duct 7 extends proximate to the upper surface 3a of the instrument panel 3, cool air from the air conditioner main body 10 is heated. Allowing the air duct 7 to extend below the cross beam 6 increases a distance between the air duct 7 and the upper surface 3a of the instrument panel 3. This structure can reduce an influence of the heat of the upper surface 3a of the instrument panel 3 on the air in the air duct 7.

Especially by allowing the air duct 7 to extend at the position lower than the air bag 20 and the air bag bracket 21, the influence of the heat of the upper surface 3a of the instrument panel 3 on the air in the air duct 7 can be efficiently reduced.

Moreover, allowing the air duct 7 to extend not above but below the cross beam 6 can lower a height H1 of the upper surface 3a of the instrument panel 3. Forward visibility of a driver is improved with lower height H1 of upper surface 3a of the instrument panel 3.

Points to be noted relating to the technique described in the embodiment will be listed. Within the instrument panel 3, various devices are arranged other than the cross beam 6, the air conditioner main body 10, the air ducts 7, 17, and the air bag 20, however, these devices are not shown in FIG. 1 or 2.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A front part structure of a vehicle cabin, the front part structure comprising:
    an instrument panel including an air outlet at an end of the instrument panel on a passenger seat side;
    an air conditioner main body arranged inside the instrument panel at a center in a vehicle width direction;
    a cross beam arranged inside the instrument panel and connected to a right side and a left side of a vehicle body; and
    an air duct arranged inside the instrument panel and connecting the air conditioner main body to the air outlet,
    wherein
    the air duct extends in front of the passenger seat at a height lower than the cross beam.

2. The front part structure of claim 1, wherein the air duct extends under an air bag for the passenger seat.

3. The front part structure of claim 2, wherein the air duct extends under an air bag bracket that is fixed to the cross beam and supports the air bag.

* * * * *